United States Patent

Schmitz (10) Patent No.: US 11,332,155 B2
(45) Date of Patent: May 17, 2022

(54) METHOD FOR OPERATING A DRIVE TRAIN OF A TRANSPORTATION VEHICLE AND DRIVE TRAIN FOR A TRANSPORTATION VEHICLE

(71) Applicant: VOLKSWAGEN AKTIENGESELLSCHAFT, Wolfsburg (DE)

(72) Inventor: Dietmar Schmitz, Wolfsburg (DE)

(73) Assignee: VOLKSWAGEN AKTIENGESELLSCHAFT

(*) Notice: Subject to any disclaimer, the term of this patent is extended or adjusted under 35 U.S.C. 154(b) by 270 days.

(21) Appl. No.: 16/727,572

(22) Filed: Dec. 26, 2019

(65) Prior Publication Data

US 2020/0207364 A1 Jul. 2, 2020

(30) Foreign Application Priority Data

Dec. 28, 2018 (DE) .................. 10 2018 133 648.9

(51) Int. Cl.
*B60K 23/08* (2006.01)
*B60W 50/10* (2012.01)
(Continued)

(52) U.S. Cl.
CPC ............ *B60W 50/10* (2013.01); *B60K 1/02* (2013.01); *B60K 6/52* (2013.01); *B60K 7/0007* (2013.01);
(Continued)

(58) Field of Classification Search
CPC .............. B60W 50/10; B60W 10/119; B60W 2300/18; B60K 6/52; B60K 17/34; B60K 1/02; B60K 7/0007; B60K 2023/085
See application file for complete search history.

(56) References Cited

U.S. PATENT DOCUMENTS 4,872,525 A    10/1989 Sommer
5,819,194 A *  10/1998 Hara .................. B60K 17/35
                                                475/221
(Continued)

FOREIGN PATENT DOCUMENTS

DE        3838709 A1    6/1989
DE    102008032476 A1    1/2010
(Continued)

*Primary Examiner* — Fadey S. Jabr
*Assistant Examiner* — Naeem Taslim Alam
(74) *Attorney, Agent, or Firm* — Barnes & Thornburg, LLP (57) ABSTRACT

A method for operating a drive train of a transportation vehicle wherein the drive train is switched between a first operating state, in which a two-wheel drive of the drive train is activated, and a second operating state, in which a four-wheel drive of the drive train is activated. The drive train is switched by an electronic computing device from one of the operating states to the other operating state. During the driving of the transportation vehicle, a demand time is determined by the electronic computing device not later than which the switching from the one operating state to the other operating state must be completed, the demand time lying in the future with respect to the determination of the demand time. The switching from the one operating state to the other operating state is commenced at a starting time in advance of the demand time.

19 Claims, 2 Drawing Sheets

(51) Int. Cl.
  *B60W 10/119*  (2012.01)
  *B60K 7/00*  (2006.01)
  *B60K 6/52*  (2007.10)
  *B60K 17/34*  (2006.01)
  *B60K 1/02*  (2006.01)

(52) U.S. Cl.
  CPC .............. *B60K 17/34* (2013.01); *B60K 23/08* (2013.01); *B60W 10/119* (2013.01); *B60K 2023/085* (2013.01); *B60W 2300/18* (2013.01)

(56) References Cited

U.S. PATENT DOCUMENTS

| | | | |
|---|---|---|---|
| 8,764,299 | B2 | 7/2014 | Torii |
| 9,481,243 | B2 | 11/2016 | Larkin et al. |
| 2005/0211526 | A1* | 9/2005 | Averill .................... F16D 47/06 192/58.41 |
| 2008/0223634 | A1* | 9/2008 | Yamamoto .............. B60L 50/16 180/65.285 |
| 2011/0167944 | A1* | 7/2011 | Yoshinami ............ B60W 30/20 74/473.1 |
| 2014/0020490 | A1* | 1/2014 | Greiss .................. B60K 17/344 74/405 |
| 2014/0058638 | A1* | 2/2014 | Taniguchi ............. B60W 10/06 701/69 |
| 2015/0019094 | A1* | 1/2015 | Larkin ................... B60K 23/08 701/65 |
| 2015/0142280 | A1* | 5/2015 | Tamoto ................. B60W 30/19 701/53 |
| 2015/0291027 | A1 | 10/2015 | Strasser et al. |
| 2016/0221565 | A1* | 8/2016 | Temple .................. B62D 6/007 |
| 2017/0166053 | A1* | 6/2017 | Ogawa ................. B60W 40/114 |
| 2017/0313185 | A1 | 11/2017 | Weidemann et al. |
| 2018/0134154 | A1* | 5/2018 | Shimizu .................. F16D 48/06 |
| 2018/0265092 | A1* | 9/2018 | Yoneda ........... B60W 30/18172 |
| 2019/0039621 | A1* | 2/2019 | Takahashi ............ B60W 10/119 |
| 2019/0299997 | A1 | 10/2019 | Schlegel et al. |
| 2019/0367003 | A1* | 12/2019 | Okada ................. B60W 30/182 |
| 2020/0122730 | A1* | 4/2020 | Shimizu ............... B60K 17/348 |

FOREIGN PATENT DOCUMENTS

| | | |
|---|---|---|
| DE | 112010003926 T5 | 12/2012 |
| DE | 102012020906 A1 | 4/2014 |
| DE | 102014213663 A1 | 1/2015 |
| DE | 102013108691 A1 | 2/2015 |
| DE | 102014016437 A1 | 5/2016 |
| DE | 102016208792 A1 | 11/2017 |
| DE | 102016209984 A1 | 12/2017 |
| DE | 102016220411 A1 | 4/2018 |
| WO | 2016079190 A1 | 5/2016 |

* cited by examiner

METHOD FOR OPERATING A DRIVE TRAIN OF A TRANSPORTATION VEHICLE AND DRIVE TRAIN FOR A TRANSPORTATION VEHICLE

PRIORITY CLAIM

This patent application claims priority to German Patent Application No. 10 2018 133 648.9, filed 28 Dec. 2018, the disclosure of which is incorporated herein by reference in its entirety.

SUMMARY

Illustrative embodiments relate to a method for operating a drive train of a transportation vehicle. Illustrative embodiments further relate to a drive train for a transportation vehicle.

BRIEF DESCRIPTION OF THE DRAWINGS

In the following, an exemplary embodiment is described. For this, there are shown.

DETAILED DESCRIPTION

Illustrative embodiments relate to a method for operating a drive train of a transportation vehicle. Illustrative embodiments further relate to a drive train for a transportation vehicle.

Such methods for the operating of drive trains of transportation vehicles as well as such drive trains for transportation vehicles are already well known from the general prior art and especially from series transportation vehicle production. In the respective method, the drive train is switched by an electronic computing device, especially the drive train, from a two-wheel drive to a four-wheel drive. This means that the four-wheel drive, usually also known as an all-wheel drive, is at first deactivated and it is activated in the method that is, switched on. While the four-wheel drive is deactivated, the two-wheel drive is activated. The transportation vehicle thus comprises, for example, at least or precisely four wheels, by which the transportation vehicle is supported at the bottom in the transportation vehicle height direction during its driving on a roadway, along which the transportation vehicle is moving during its driving. During the two-wheel drive, only two of the wheels in regard to the wheels are driven by a drive device of the transportation vehicle. By switching to the four-wheel drive or by switching on the four-wheel drive, at least or precisely four of the wheels in regard to the wheels are driven by the drive device, thereby realizing, for example, a better traction of the transportation vehicle as compared to the two-wheel drive.

Disclosed embodiments provide a modified a method and a drive train of the above-mentioned kind so that the four-wheel drive can be switched on in an especially beneficial manner.

Disclosed embodiments provide a method and a drive train.

A first disclosed embodiment relates to a method for operating a drive train of a transportation vehicle, especially a passenger car. In the method, the drive train can be switched between a first operating state, in which a two-wheel drive of the drive train is activated, and a second operating state, in which a four-wheel drive of the drive train is activated. In other words, the drive train can be operated, especially by selection, in the first operating state and in the second operating state. While the first operating state and hence the two-wheel drive are activated, so that the drive train is operated in the first operating state, the second operating state and hence the four-wheel drive are deactivated. While the second operating state and hence the four-wheel drive are activated, so that the drive train is operated in the second operating state, the first operating state and hence the two-wheel drive are deactivated. In the method, the drive train is switched by an electronic computing device from one of the operating states to the other operating state. Hence, for example, the drive train in the method is switched from the first operating state and hence from the two-wheel drive to the second operating state and hence to the four-wheel drive, and/or the drive train in the method is switched from the second operating state and hence from the four-wheel drive to the first operating state and hence to the two-wheel drive. The computing device, for example, is a component of the transportation vehicle and may comprise at least or precisely one electronic controller or multiple electronic controllers.

In the method, for example, at first the two-wheel drive is activated, while the four-wheel drive is deactivated. The switching from the two-wheel drive to the four-wheel drive is also known as switching on the four-wheel drive, so that the at first deactivated four-wheel drive is activated and thus switched on. For example, if the four-wheel drive is at first activated, while the two-wheel drive is deactivated, then, for example, the four-wheel drive can be deactivated or switched off, whereby the two-wheel drive is activated. The switching from the two-wheel drive to the four-wheel drive is also known as switching on the four-wheel drive, so that the at first deactivated four-wheel drive is activated and thus switched on. The switching from the four-wheel drive to the two-wheel drive is also known as the switching off or deactivating of the four-wheel drive, so that the at first activated four-wheel drive is deactivated or switched off.

The drive train comprises, for example, at least or precisely four wheels of the transportation vehicle. The wheels are ground contact elements, by which the transportation vehicle can be supported or braced at the bottom in the transportation vehicle height direction on a roadway, while the transportation vehicle is traveling along the roadway. Optionally, the method is carried out during the driving of the transportation vehicle, which travels during its driving along the roadway. During the driving, the wheels roll along the roadway. For example, the transportation vehicle is driven in this process by a drive device of the drive train. During the two-wheel drive, during which the two-wheel drive is activated and the four-wheel drive is deactivated, precisely two of the wheels are driven by the drive device in regard to the wheels. By the switching on of the four-wheel drive or by the switching from the two-wheel drive to the four-wheel drive, during which the two-wheel drive is deactivated and the four-wheel drive is activated, at least or precisely four wheels or all wheels of the transportation vehicle are driven by the drive device in regard to the wheels, so that the four-wheel drive is an all-wheel drive, for example. By the switching off of the initially activated four-wheel drive or by the switching from the four-wheel drive to the two-wheel drive, at most or precisely two of the wheels of the transportation vehicle are driven by the drive device in regard to the wheels.

Now, to switch on and/or switch off the four-wheel drive especially as needed and timely or in advance, so that, for example, the switching on or switching off of the four-wheel drive is finished in good time or early enough, especially completely, it is provided according to the disclosure that during the driving of the transportation vehicle, a demand time is determined by the electronic computing device, not later than which the switching from the one operating state to the other operating state must be completed, that is, the switching on or the switching off of the four-wheel drive. The demand time is a future time with respect to the determination of the demand time, so that the demand time lies in the future with respect to the determination of the demand time. This means that the demand time is determined at a first time or during a first time period, the demand time occurring after the first time or after the first time period, especially such that an interval of time occurs between the first time or the first time period and the demand time. Since the demand time lies in the future with respect to the determination of the demand time, the demand time is also known as the future demand time.

Furthermore, it is provided that depending on the demand time so determined the switching from the one operating state to the other operating state is commenced at a starting time in advance of and prior to the demand time such that the switching is finished, especially completely, by not later than the demand time. This means that the switching does not commence at the demand time, but rather the switching commences prior to the demand time, so that the switching is finished, especially completely, by not later than the demand time. Since the demand time lies in the future with respect to the determination of the demand time, the demand time is predicted, i.e., ascertained by prediction, in the context of the disclosed method.

By the switching on of the four-wheel drive, the so-called traction of the transportation vehicle is increased, for example, relative to the two-wheel drive. Thanks to the switching off of the four-wheel drive, an especially efficient and thus low energy consuming operation of the drive train can be realized. The demand time is a future second time with respect to the above-described first time or with respect to the above-described first time period regarding which it is or would be determined, for example, that the four-wheel drive and the concomitant higher traction as compared to the two-wheel drive might be beneficial with a certain probability, especially in regard to the realization of a higher driving dynamics and/or a safer driving condition of the transportation vehicle. Moreover, it is conceivable, especially in regard to the switching off of the four-wheel drive, that it is or would be determined with regard to the second time that the two-wheel drive may be beneficial as compared to the four-wheel drive with a certain probability, especially in regard to the realization of a low energy consuming operation while at the same time realizing an adequate traction and thus a safe driving condition of the transportation vehicle.

Now, since the switching on or the switching off of the four-wheel drive commences not at the demand time itself, but rather at the start time which occurs prior to the demand time, so that the switching on or the switching off of the four-wheel drive is finished, especially completely, by not later than the demand time, the switching on or switching off of the four-wheel drive commences at a third time as the start time, while at the start time the finished switching on or switching off of the four-wheel drive is not yet required as compared to the demand time. The third time, for example, occurs prior to the demand time and follows the first time or the first time period. Thus, since the switching on or the switching off of the four-wheel drive commences before the complete switching on or switching off of the four-wheel drive is required, because this complete switching on or switching off of the four-wheel drive is required or desired not later than the demand time, in the context of the disclosed method the four-wheel drive is switched on or switched off predictively, that is, proactively. The four-wheel drive is then completely switched on or switched off not later than the demand time at which the four-wheel drive may be beneficial or has been estimated to be beneficial relative to the two-wheel drive, or the two-wheel drive relative to the four-wheel drive.

The disclosed method makes it possible, on the one hand, to operate the transportation vehicle for as long as possible, that is, for the longest possible periods of time and hence with the largest possible portions during the overall operation of the transportation vehicle with the two-wheel drive, which can ensure an especially efficient and thus a more efficient or low energy consuming, especially low fuel consuming operation of the transportation vehicle. On the other hand, the disclosed method can ensure an especially safe operation and/or an especially good driving dynamics of the transportation vehicle, since the four-wheel drive is or can be switched on especially as needed and optionally only when this is beneficial for safety reasons and/or driving dynamic reasons or has been judged to be beneficial by the electronic computing device. For example, the start time lies in the future with respect to the determination of the demand time, and the start time occurs, for example, between the first time or the first time period and the demand time.

Furthermore, the disclosure is based on the knowledge that a switching period known as a build-up time or build-up period is usually required to switch the drive train from the one operating state to the other operating state. This means that the switching on or the switching off of the four-wheel drive cannot occur infinitely fast and thus cannot coincide with the start of the switching. In other words, the drive train needs the switching period, commencing at the start time and being greater than zero, to commence at the start time and finish, especially completely, the switching on or the switching off of the four-wheel drive. The switching on or switching off of the four-wheel drive, commencing at the start time, ends, for example, at a switching or operating time at which the switching on or switching off of the four-wheel drive, having commenced at the start time, is finished, especially completely finished. Hence, the switching period extends, for example, exactly from the start time to exactly the switching time, especially continuously or free of interruption, while the operating time (switching time) follows the start time and is spaced apart from the start time, especially by the switching period. The switching period may, for example, lie in the range of 300 milliseconds to 400 milliseconds, inclusively.

The start time is characterized, for example, by at least one start event or start signal, which is provided, for example, by the electronic computing device to commence the switching on of the four-wheel drive by the start signal. In other words, the electronic computing device provides the start signal at the start time to bring about the switching on or the switching off of the four-wheel drive at the start time. Beginning at the start time, the drive train then requires the switching period for the switching on or switching off of the four-wheel drive to be completely finished at the switching time. In regard to the switching on, the start signal comprises or characterizes, for example, a torque which is to be provided by the drive device by switching on the four-wheel drive, especially in addition as compared to the two-wheel drive. The operating time is characterized, for example, in that the drive device will provide the torque, especially the additional torque, as of or by the operating time.

Since the demand time is predicted in the context of the disclosed method and since the four-wheel drive is switched on or switched off predictively, the switching time (operating time) coincides with the demand time or the switching time precedes the demand time, so that it can be ensured with a very high probability that not later than the demand time the four-wheel drive, having been deactivated prior to the start time and not yet fully activated prior to the switching time and after the start time, will be completely switched on, that is activated, at the demand time, or that not later than the demand time the four-wheel drive, having been activated prior to the start time and not yet fully deactivated before the switching time and after the start time, will be completely switched off, that is deactivated, at the demand time. In this way, unnecessary switching on of the four-wheel drive and overly long periods of time during which the four-wheel drive is activated can be avoided, so that the transportation vehicle or the drive train can be operated for especially large portions of the overall operation with the two-wheel drive. In this way, the energy consumption can be kept especially low. Moreover, the four-wheel drive can be switched on or switched off only when this has been judged to be required, so that furthermore an especially safe and/or sporty operation of the drive train and hence of the transportation vehicle as a whole can be realized.

In a disclosed embodiment, the switching commences based on the previously described switching period, which is required by the drive train for the switching, especially completely, from the one operating state to the other operating state. The electronic computing device, for example, determines, in particular, calculates, the start time at which the switching commences for the switching to be completely finished by not later than the demand time, based on the switching period, so that it can be ensured with a high probability that the four-wheel drive will be completely switched on or switched off not later than the demand time.

It has proven to be especially beneficial for the switching time to be calculated by the electronic computing device, especially as the situation demands. By this is meant that in respective consecutive driving situations in which the disclosed method is carried out, depending on the driving situation the switching period is individually calculated or recalculated by the electronic computing device. In this way, it can be ensured for each driving situation that the switching on of the four-wheel drive is completely finished by not later than the demand time. This disclosed embodiment is based on the awareness that the switching time may vary, especially on account of external boundary conditions such as an ambient temperature. For example, the switching period will be calculated based on the ambient temperature and/or based on an energy available for the switching, especially electrical energy.

A further disclosed embodiment is characterized in that the switching period is determined based on at least one value which is stored in a memory, especially an electronic memory, especially that of the computing device. For this, for example, the value will be called up from the memory and possibly processed. This disclosed embodiment is based on the awareness that at least a portion, especially at least a predominant portion of the switching period or the entire switching period may be at least substantially constant and thus, for example, will be characterized or defined by the value. If, for example, in the course of the switching on of the four-wheel drive at least one electric machine is activated, that is switched on, which is deactivated during the two-wheel drive and thus in the beginning, then the electric machine associated with the axle of the drive train or the transportation vehicle, for example, precisely one axle, will require the switching period commencing at the start time and ending, for example, at the switching time to provide the torque prescribed during the switching or characterized by the start signal and thus being the desired torque, especially to drive the wheels of the axle. As regards the electric machine, the switching period is justified in that a field build-up of the electric machine, designed, for example, as an induction machine, must occur during the switching period, so that the electric machine can provide the desired torque, for example, at the switching time. In the course of the field build-up, an electric field will be established, to drive a rotor of the electric machine by a stator of the electric machine, for example, and consequently provide the desired torque by the electric machine. This means that the field build-up requires a certain interval of time, which is characterized, for example, by the value. The switching period consists, for example, solely of the interval of time for the field build-up or at least a portion of the switching period is the interval of time for the field build-up, so that the switching period includes at least the interval of time for the field build-up of the electric machine.

In at least one disclosed embodiment, the demand time is determined based on a friction value, especially by the electrical computing device. The friction value characterizes at least a friction between at least one of the wheels of the drive train and the roadway along which the transportation vehicle is traveling. In this way, it is possible to account for the friction, especially any change in the friction, by the switching on or switching off of the four-wheel drive, so that an especially needs-based switching on or switching off of the four-wheel drive can be realized.

It has proven to be especially beneficial for the friction value to characterize a current friction between the wheel and the roadway. This can ensure an especially safe operation.

to realize an especially safe operation and/or an especially good driving dynamics of the transportation vehicle, it is provided in a further disclosed embodiment that the friction value characterizes a friction between the wheel and the roadway lying in the future with respect to the determination of the friction value. In other words, the friction value does not characterize, or does not only characterize the current friction between the wheel and the roadway, but rather the friction value characterizes a friction existing with a certain probability in future between the wheel and the roadway. This means that the friction value is determined, for example, at a fourth time or during a second time period, yet the friction value will characterize a friction that exists or prevails between the wheel and the roadway at a fifth time following the fourth time or during a third time period following the second time period. In this way, an especially beneficial, needs-based and predictive switching on or switching off of the four-wheel drive can be ensured.

To ascertain in especially early manner the friction value and hence, for example, a change in the friction value and therefore switch on the four-wheel drive as needed and predictively, it is provided in a further disclosed embodiment that a measured quantity characterizing a rotary speed of the wheel is detected by at least one sensor, especially by a rotary speed sensor, the sensor being a component of the transportation vehicle. The sensor provides an electrical signal characterizing the detected measured quantity. The signal has a number of signal events, especially signal edges, on the basis of which the rotary speed is or can be determined. The number here is at least 80, especially 90. Optionally, the number is at least or precisely 96, so that the signal comprises at least 80, especially at least 90, and optionally precisely 96 signal events, especially signal edges also known as flanks.

The particular signal event, especially the particular signal edge, corresponds, for example, to a particular rotary position of the wheel, so that the determination or detection of two immediately consecutive signal edges can be used to determine or detect a rotation of the wheel about an angle of rotation. Thanks to the large number of signal edges, a complete revolution of the wheel can be resolved in an especially fine or precise manner, since, for example, precisely one complete revolution of the wheel can be detected by the detection of the number of signal edges. Now, since the very large number of signal edges is available to determine the revolution and thus the rotary speed of the wheel, changes in the rotary speed and thus any changes in the friction or the friction value can be determined especially early. This is because the sensor can detect a partial number of signal edges, smaller than the total number but greater than zero, already at a very slight lesser rotation of the wheel, as compared to a complete revolution of the wheel. This makes possible an especially precise and early and/or predictive estimation or determination of the friction value, which can also be called a friction value estimation or friction value determination, so that consequently an especially needs-based and proactive switching on or switching off of the four-wheel drive can be realized.

The respective signal event, especially the respective signal edge, is a rotary speed pulse, the rotary speed pulses being ascertained or evaluated to determine the rotary speed of the wheel. It is conceivable for the rotary speed pulses to be correlated with ascertained or calculated forces and/or torques acting, for example, from and/or on the wheel, so as to determine in especially precise manner the rotary speed and thus the friction value in this way.

It has proven to be especially beneficial for the rotary speed of the wheel to be determined based on a subset of the signal edges, wherein the subset is larger than 1, especially larger than 3, and less than the number. Optionally, the subset is less than 10, especially less than 5. This makes possible an especially early determination, in particular, an estimation, of the friction value, so that a demand for the switching on or switching off of the four-wheel drive and thus the demand time can be ascertained especially early. Consequently, the switching on or switching off of the four-wheel drive can be commenced early enough so that the switching on or switching off is completely finished by not later than the demand time. Optionally, the subset is the previously mentioned partial number.

Finally, it has proven to be especially beneficial for the demand time to be determined based on an operating state of the drive train, especially one set by the driver of the transportation vehicle, or for the switching to commence based on the operating state of the drive train. The operating state characterizes, for example, a setting of the drive train oriented to a high driving dynamics or an especially sporty setting of the drive train, so that an especially precise conclusion can be drawn on the basis of the current operating state that the switching on or switching off of the four-wheel drive might be beneficial in the near future.

Alternatively or additionally, it is provided that the demand time is determined based on a driving profile selected by the driver of the transportation vehicle or for the switching to commence based on the selected driving profile. For example, the drive train may comprise several driving profiles, such as "normal" and/or "eco" and/or "sporty". If the driver has selected the "sporty" driving profile, for example, the demand time will be determined earlier than the "normal" driving profile, for example, or the demand time will then occur earlier, to ensure a sufficiently high driving dynamics and a safe operation.

Alternatively or additionally, it is provided that the demand time is determined based on a state of an electronic stability program of the transportation vehicle, especially one set by the driver of the transportation vehicle, or for the switching to commence based on the state of the stability program. The reason for this disclosed embodiment is that the driver may fully or partly deactivate the electronic stability program (ESP), especially as compared to a fully activated state of the electronic stability program. The demand time may be earlier as compared to the fully activated state, so that the switching on of the four-wheel drive commences earlier.

Alternatively or additionally, it is provided that the demand time is determined based on a trailer operation of the transportation vehicle or for the switching to commence based on the trailer operation. The trailer operation is determined or recognized, for example, by a mechanism of the transportation vehicle. By trailer operation is meant that the transportation vehicle is coupled to a trailer. The reason for this disclosed embodiment is that a trailer coupled to the transportation vehicle can influence the driving behavior of the transportation vehicle, so that the demand time is then earlier, for example, as compared to a condition in which no trailer is coupled to the transportation vehicle.

Alternatively or additionally, it is provided that the demand time is determined based on a change in a position of an operating element produced by the driver, or for the switching to commence based on a change in the position of the operating element produced by the driver, wherein a torque provided by the drive device of the drive train can be adjusted by the driver by the operating element, configured, for example, as a pedal, especially a gas pedal. For example, the operating element is a pedal which the driver can activate by his foot.

For example, if the change in the position exceeds a limit value, so that, for example, a speed by which the operating element is moved exceeds the limit value, this means an abrupt change desired by the driver in the torque provided or to be provided by the drive device for the driving of the transportation vehicle. Such an excessively abrupt change in the torque provided by the drive device may result in unfavorable driving situations, which can now be avoided in that the demand time is determined based on the change in the position of the operating element. Consequently, switching can occur early enough from the two-wheel drive to the four-wheel drive to ensure an especially safe and at the same time dynamic operation of the transportation vehicle.

A second disclosed embodiment relates to a drive train for a transportation vehicle, the drive train being adapted to carry out a disclosed method. The drive train comprises an electronic computing device by which the drive train can be switched between a first operating state, in which a two-wheel drive of the drive train is activated, and a second operating state, in which a four-wheel drive of the drive train is activated.

Now, to realize an especially beneficial and particularly early and needs-based switching from one of the operating states to the other operating state, the electronic computing device is adapted, during the driving of the transportation vehicle, to determine a demand time not later than which the switching from the one operating state to the other operating state must be completed, especially completely, wherein the demand time lies in the future with respect to the determination of the demand time.

Furthermore, the electronic computing device is adapted, depending on the demand time so determined, especially previously determined, to commence the switching from the one operating state to the other operating state at a starting time in advance of the demand time such that the switching is completed by not later than the demand time.

The disclosure also includes modifications of the disclosed method having features which have already been described in connection with the modifications of the disclosed transportation vehicle. For this reason, the corresponding modifications of the disclosed method will not be again described here.

The disclosure also encompasses the combination of the features of the described embodiments.

In the exemplary embodiment, the components described in the embodiment represent each time individual features of the disclosure, to be viewed independently of each other, which also modify the disclosure independently of each other and thus are also to be regarded individually or in any combination other than the one shown as being part of the disclosure. Furthermore, the described embodiment may also be amplified by other of the already described features of the disclosure.

In the figures, functionally equal elements are each time given the same reference numbers.

Figure 1:
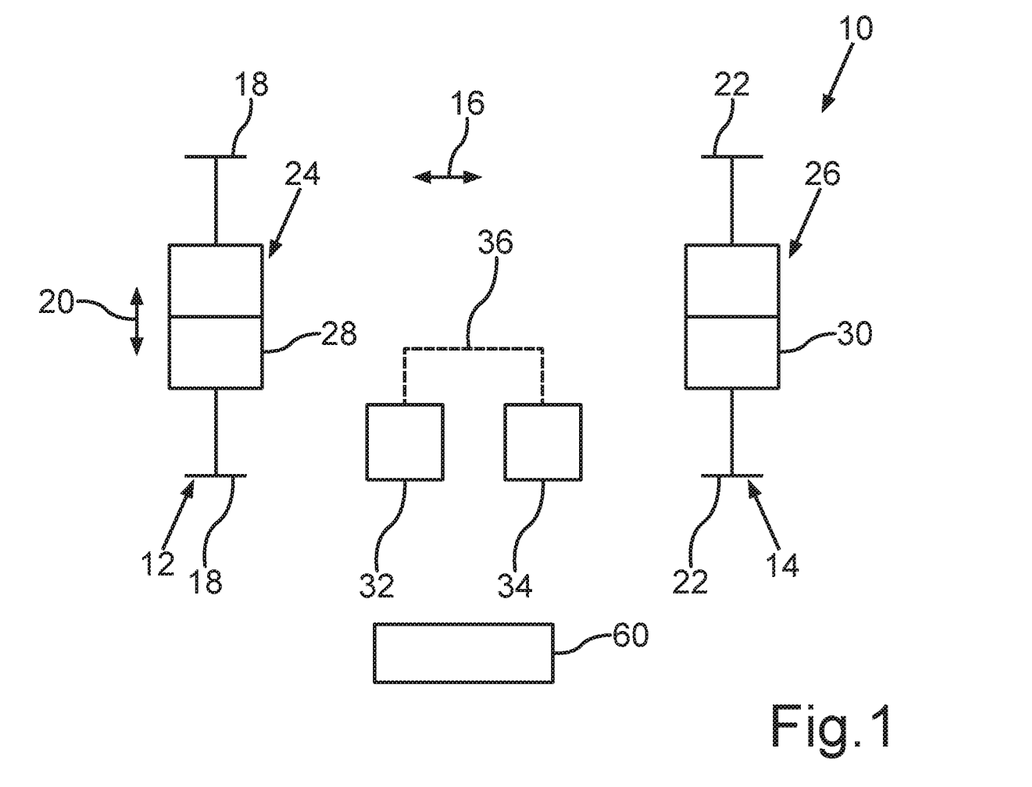
FIG. 1 shows a schematic representation of a disclosed drive train.

FIG. 1 shows in a schematic representation a drive train 10 for a transportation vehicle, especially a passenger car. The drive train 10 comprises at least or precisely two axles 12 and 14 arranged in succession in the transportation vehicle longitudinal direction and thus being consecutive to each other, the axle 12 also being called the first axle and the axle 14 also being called the second axle. The transportation vehicle longitudinal direction in FIG. 1 is illustrated by a double arrow 16. The axle 12 comprises at least or precisely two first wheels 18, spaced apart from each other in the transportation vehicle transverse direction, which are the front wheels of the transportation vehicle, for example. Thus, the axle 12 is, for example, a front axle of the transportation vehicle. In FIG. 1, the transportation vehicle transverse direction is illustrated by a double arrow 20. The axle 14 comprises at least or precisely two second wheels 22, which are spaced apart from each other in the transportation vehicle transverse direction. The wheels 22 are, for example, rear wheels of the transportation vehicle, so that the axle 14 is, for example, a rear axle of the transportation vehicle.

The drive train 10 comprises a first drive device 24, which is associated solely with the axle 12 of the axles 12 and 14. Thus, the drive device 24 is associated only with the wheels 18 of the wheels 18 and 22, so that only the axle 12 of the axles 12 and 14 can be driven by the drive device 24. In other words, only the wheels 18 of the wheels 18 and 22 can be driven by the drive device 24, so that the drive device 24 can only drive the wheels 18 of the wheels 18 and 22, but not the wheels 22. The drive train 10 furthermore comprises a second drive device 26, which is associated only with the axle 14 of the axles 12 and 14. This means that the drive device 26 is associated only with the wheels 22 of the wheels 18 and 22, so that only the wheels 22 of the wheels 18 and 22 can be driven by the drive device 26, but not the wheels 18.

The respective drive device 24 or 26 may comprise at least or precisely one combustion engine, by which the respective wheels 18 or 20 can be driven. Alternatively or additionally, the respective drive device 24 or 26 may comprise at least or precisely one electric machine, by which the respective wheels 18 or 22 can be electrically driven.

In the exemplary embodiment shown in FIG. 1, the drive device 24 comprises at least or precisely one first electric machine 28, by which the wheels 18 can be electrically driven. Moreover, the drive device 26 comprises at least or precisely one second electric machine 30, by which the wheels 22 can be electrically driven. Optionally, the transportation vehicle is designed as an electric transportation vehicle, especially a battery electric transportation vehicle (BEV), so that the wheels 18 and 22 can be exclusively electrically driven. Alternatively, it is conceivable for the transportation vehicle to be designed as a hybrid transportation vehicle, especially a plug-in hybrid. The axles 12 and 14 are mechanically decoupled from each other and thus not coupled together in torque-transmitting manner, so that there is no mechanical, torque-transmitting coupling of the axles 12 and 14.

To electrically drive the respective wheels 18 or 22 by the respective electric machine 28 or 30, for example, the respective electric machine will be driven in a motor operation and thus as an electric motor. The respective electric machine 28 or 30 will then be in a traction operation. In other words, to drive the respective wheels 18 or 22 by the respective drive device 24 or 26, a respective traction operation of the respective drive device 24 or 26 is set, so that in the traction operation the respective wheels 18 or 22 are driven by the respective drive device 24 or 26. Moreover, a coasting operation also known as a towing operation of the respective drive device 24 or 26 is also conceivable. In the respective coasting operation, the respective drive device 24 or 26 is driven by the respective wheels 18 and 22 and thus, for example, by kinetic energy of the moving transportation vehicle. By the respective coasting operation, the respective wheels 18 or 22 are braked and thus slowed down or prevented from accelerating.

The drive train 10 furthermore comprises a first electronic controller 32, which is also called a drive controller (ASG). By the controller 32, the drive devices 24 and 26 can be actuated to adjust a torque for the driving of the respective wheel 18 or 22, also known as an individual torque, to be provided by the respective drive device 24 or 26.

The drive train 10 furthermore comprises a second electronic controller 34, provided in addition to the controller 32 and designed separately from the controller 32, by which at least one braking moment can be set, for example, for the braking of the transportation vehicle. The braking moment is, for example, a dragging moment of the respective drive device 24 or 26, also known as the thrust torque, the dragging moment being taken up, for example, in the coasting operation of the respective drive device 24 or 26 to drive the respective drive device 24 or 26 in the coasting operation. A service brake of the drive train can be actuated by the controller 34. It can be seen from FIG. 1 that the controllers 32 and 34 are separate units.

Now, to realize an especially beneficial torque apportionment with cost, design space, and weight benefits between the drive devices 24 and 26 and thus between the axles 12 and 14, in a method for operating the drive train 10 an overall torque on the drive devices 24 and 26, as demanded by the driver of the transportation vehicle and provided by the drive devices 24 and 26 together or in sum, is determined by the controller 34, also known as the brake controller. For example, in the course of a determination of the driver's wishes, the overall torque demanded and thus desired by the driver is determined. By the apportionment of the overall torque between the drive devices 24 and 26 and thus between the axles 12 and 14 is meant, for example, that the brake controller determines, in particular, calculates, a first partial torque to be provided by the drive device 24 and a second partial torque to be provided by the drive device 26, the partial torques in total yielding the overall torque. The partial torques may be the aforementioned individual torques, so that when the drive devices 24 and 26 provide partial torques or the individual torques, especially at the same time, the overall torque desired by the driver is provided as a whole. Hence, the overall torque demanded by the driver is also a desire by the driver, known as the driver's wish, for a providing of the overall torque to be accomplished by the drive devices 24 and 26. The respective partial torque may be zero, less than zero, or greater than zero, while the overall torque demanded by the driver is greater than or less than zero, or zero.

In the method, the controller 34 provides, for example, via an onboard network 36 shown in schematically in FIG. 1, an electrical allocation signal, characterizing the apportionment determined by the controller 34. Through the onboard network 36, the allocation signal is relayed by the controller 34 to the controller 32, so that the controller 32 receives via the onboard network 36 the allocation signal. Based on the received allocation signal, the controller 32 actuates the drive devices 24 and 26 so that the individual torques are provided by the drive devices 24 and 26, especially at the same time, and correspond in total to the overall torque. The respective individual torque may correspond to zero, greater than zero or less than zero, and especially when one of the individual torques is zero, the other individual torque is greater than or less than zero. Optionally, the overall torque is a torque different from zero. If the respective individual torque is greater than zero, then the respective individual torque is, for example, a traction torque, so that the drive device 24 or 26 which provides the traction torque is in traction operation. If the respective individual torque is less than zero, then the respective individual torque is, for example, a recuperation or braking or dragging moment, so that, for example, the drive device 24 or 26 which provides the thrust torque, also known as the dragging moment, is operated in the coasting operation and is driven, for example, by the wheels 18 or 22 of the axle 12 or 14, which is associated with the respective drive device 24 or 26.

The coasting operation may be a recuperation operation of the respective electric machine 28 or 30. In the recuperation operation, the electric machine 28 or 30 is operated as a generator, which is driven by the wheels 18 or 22. Thus, kinetic energy of the transportation vehicle is transformed by the generator into electrical energy, which is provided by the generator. The electrical energy provided by the generator may be stored, for example, in a storage device designed for the storing of electrical energy. The storage device may, for example, be designed as a battery, especially a high-voltage battery.

Figure 2:
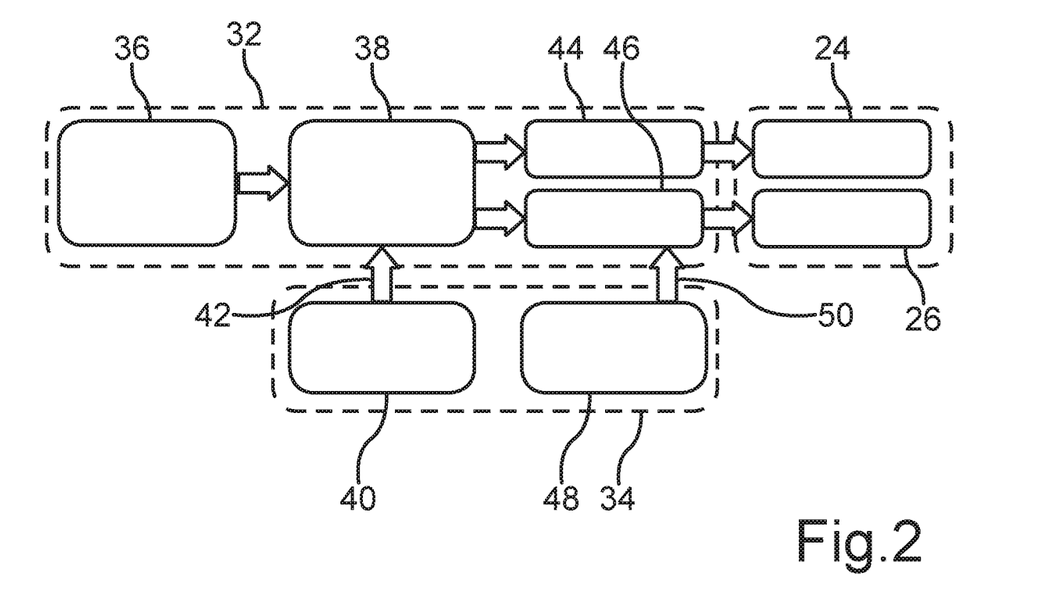
FIG. 2 shows a flow chart to illustrate a disclosed method.

FIG. 2 shows a flow chart to illustrate the method more closely. A block 36 in FIG. 2 illustrates, for example, that the controller 32 (drive controller) determines the overall torque demanded and thus desired by the driver, especially in the course of a determination of the driver's wishes. A block 38 illustrates that a second apportionment of the overall torque demanded by the driver of the transportation vehicle between the drive devices 24 and 26 and thus between the axles 12 and 14, different from the previously described apportionment, is determined, for example, by the drive controller (controller 32), especially in the course of a length distribution operating strategy. The second apportionment is thus, for example, a proposal made for the apportionment of the overall torque between the axles 12 and 14 by the controller 32. For example, the drive controller proposes the second apportionment in the interest of the most efficient and thus lowest energy consumption operation of the transportation vehicle. The brake controller (controller 34) determines, for example, the first apportionment in the interest of the highest possible driving dynamics of the transportation vehicle. The first apportionment, which is determined, especially calculated, by the brake controller, is illustrated in FIG. 2 by a block 40. An arrow 42 illustrates that the first apportionment overrules or replaces the second apportionment and that the allocation signal is relayed by the brake controller to the drive controller. The first apportionment determined by the brake controller is thus implemented by the drive devices 24 and 26, through the intermediation of the drive controller, since the brake controller does not actuate the drive devices 24 and 26, but rather the drive controller implements the first apportionment as determined by the brake controller, since the drive controller and not the brake controller actuates the drive devices 24 and 26.

The electric machine 28 is associated, for example, with a first power electronics, and the electric machine 30 is associated, for example, with a second power electronics. To implement the apportionment of the overall torque between the axles 12 and 14 as determined by the brake controller, the power electronics are actuated by the drive controller. After this, the drive devices 24 and 26, especially the electric machines 28 and 30, provide the respective individual torques, which in total correspond to the overall torque or yield the overall torque. In this regard, blocks 44 and 46 in FIG. 2 illustrate so-called torque paths by which the individual torques are ultimately implemented by the actuating of the electric machines 28 and 30, the actuating of the electric machines 28 and 30 being accomplished by the drive controller. Moreover, a block 48 in FIG. 2 illustrates torque interventions which may be carried out by the brake controller (controller 34). It can be seen from FIG. 2 with the aid of an arrow 50 that the brake controller intervenes through the torque interventions in the torque paths by which the drive controller implements the first apportionment to realize in this way an especially beneficial apportionment of the wheel torque between the axles 12 and 14.

The first apportionment is thus a redistribution in regard to the second apportionment, since the proposal of the drive controller is overruled or replaced by the first apportionment. Since, for example, the braking moment is or can also be set by the brake controller and/or the service brake of the transportation vehicle is or can be actuated or activated by the brake controller, and since the first apportionment is carried out by the brake controller, a unified approach is created whereby the overall torque can be apportioned between the axles 12 and 14 in a cost, design space and weight favorable manner. Since the overall torque is apportioned between the axles 12 and 14, the overall torque is apportioned in the transportation vehicle longitudinal direction, so that a longitudinal distribution of the overall torque is provided. The drive devices 24 and 26 are individual-axle motors, between which no mechanical coupling exists. The controllers 32 and 34 ensure in this regard a so to speak virtual coupling of the axles 12 and 14, since the overall torque is provided in total by the drive devices 24 and 26. Optionally, the brake controller also carries out a drive-slip control and a thrust torque control of the respective drive devices 24 and 26, whereby the unified approach within the brake controller is implemented especially beneficial.

Thanks to the described apportionment of the overall torque by the brake controller and thus thanks to the unified approach, a four-wheel or all-wheel distribution can pursue the approach of a maximum lengthwise dynamics or a maximum traction, so that a switching from a two-wheel drive to an all-wheel or four-wheel drive of the drive train 10 can occur then, and optionally only then, when it is required, for example, by a corresponding desire of the driver. Otherwise, the drive train 10 can be operated with the two-wheel drive, so that the energy consumption can be kept especially low.

The four-wheel drive can ensure an especially dynamic and safe operation. It is possible to meet the driver's wish in regard to the providing of the overall torque desired by the driver and accomplished by the drive train 10 at least in almost every driving situation. This has a positive impact on both the traction and the safety, as well as the driving dynamics of the transportation vehicle. In other words, an especially high traction with especially beneficial driving dynamics can be ensured in at least almost every driving situation.

Figure 3:
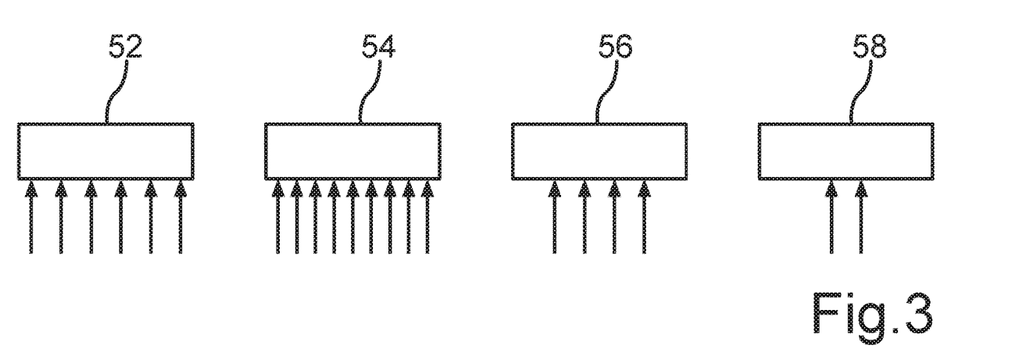
FIG. 3 shows a further diagram to illustrate the disclosed method.

FIG. 3 shows another diagram to illustrate the method and the drive train 10. In FIG. 3, a block 52 illustrates a prediction with regard to a switching from the two-wheel drive to the four-wheel or all-wheel drive. By the two-wheel drive is meant, for example, that only the wheels 18 or only the wheels 22 of the wheels 18 and 22 are driven. Thus, for example, the two-wheel drive can be set during a first time period. By the four-wheel or all-wheel drive is meant that, for example, during a second time period different from the first time period, both the wheels 18 and the wheels 22 are driven, in particular, at the same time. For example, if switching is done from the two-wheel drive to the all-wheel or four-wheel drive, then the four-wheel or all-wheel drive is so to speak switched on. The block 52 illustrates a predictive switching on of the all-wheel or four-wheel drive, which for simplicity shall simply be called the all-wheel drive in the following.

By the predictive switching on of the all-wheel drive is meant the following: between a start time, at which the switching on of the initially still deactivated all-wheel drive commences, and an operating time, at which the switching on of the all-wheel drive is finished, especially completely, where the operating time comes after the start time, there is usually a switching time, also called the setup time, which is required for the switching on of the all-wheel drive. In regard to the electric machine 28 and 30, the setup time is required, for example, since the electric machine 28 is deactivated at first in the two-wheel drive, for example. This means that the electric machine 28 is at first still not energized prior to the start time or during the two-wheel drive. The electric machine 28 or 30 needs the setup time, starting from the nonenergized state, until the electric machine 28 or 30 can provide a torque and thus apply it to the wheels 18 or 22. This is due to the field build-up of the electric machine 28 or 30, designed, for example, as an induction machine. In other words, the electric machine 28 or 30 requires the setup time, starting from its nonenergized condition, until the electric machine 28 or 30 can provide a desired torque as the respective individual or partial torque. Thus, if the initially nonenergized electric machine 28 is activated at the start time, that is, energized, then the electric machine 28 can only provide a desired torque by the energizing after the setup time and thus at the operating time.

In the course of the predictive, i.e., proactive switching on of the all-wheel drive, a demand time is thus determined, for example, by the brake controller, at which the switching on of the four-wheel drive must be finished, especially completely and/or not later than the demand time lying in the future with respect to the determination of the demand time. This means, for example, that the demand time is determined during an interval of time, where the demand time comes after the interval of time and thus lies in the future with regard to the interval of time and is spaced apart from the interval of time.

Based on the demand time so ascertained, the switching on of the all-wheel drive, that is, for example, the energizing of the electric machine 28, commences at the start time, especially based on the apportionment so determined, where the start time occurs before the demand time. The demand time may, for example, coincide with the operating time or the demand time comes after the operating time, so that the all-wheel drive is completely switched on not later than the demand time, especially starting from the two-wheel drive. In other words, based on the demand time and optionally based on the ascertained apportionment, the switching on of the all-wheel drive commences at the start time in such a way that the switching on of the all-wheel drive is finished, especially completely, not later than the demand time.

This predictive switching on of the all-wheel drive occurs, for example, by the earliest possible estimation of the friction value on the driven wheels 18 or 22, that is, those of the wheels 18 and 22 which are driven, especially when the two-wheel drive is activated. This is beneficial, since the other respective wheels 22 or 18, which are yet to be switched on and thus become driven wheels, are at least almost free of force in the deactivated state of the four-wheel drive or when the two-wheel drive is activated. The method is carried out during an operation of the transportation vehicle, which is supported during the driving along a roadway and thus at the bottom in the transportation vehicle height direction by the wheels 18 and 22 on the roadway. By the estimation of the friction value is meant a determination, especially an estimation, of a friction value characterizing a friction between the respective driven wheel 18 or 22 and the roadway. Since in the present case, for example, the axle 12 is switched in with the axle 14 by the switching on of the all-wheel drive, so that during the two-wheel drive the rear wheels are or were driven, the predictive switching on of the all-wheel drive occurs, for example, by the earliest possible estimation of the friction value on the rear axle and thus on the wheels 22.

Moreover, it may be provided that the all-wheel drive is carried out based on a driving profile selected by the driver and/or based on an operating state of the drive train 10 selected by the driver, and/or based on a state of an electronic stability program selected by the driver and/or based on whether the transportation vehicle is coupled to a trailer and/or based on a change in a position of an operating element produced by the driver. The operating element is situated in the interior of the transportation vehicle and can be activated, especially moved, to demand or set the overall torque by the driver. In this way, an especially efficient operation can be realized with no noteworthy traction drawbacks. In other words, it is possible on the one hand to maintain the two-wheel operation for as long as possible. In this way, an especially efficient operation can be ensured. On the other hand, the all-wheel drive can be switched on then and optionally only then, especially predictively, when this is desired or required.

Furthermore, a block 54 in FIG. 3 illustrates a so-called basic distribution, which is carried out by the brake controller. The brake controller, for example, starts from the basic distribution and then carries out a redistribution, illustrated by a block 56, whereby the basic distribution is changed. The allocation signal then characterizes, for example, the redistribution, so that the redistribution is the first apportionment, for example. The basic distribution occurs, for example, based on learned friction values and/or velocities and/or accelerations in the transportation vehicle longitudinal direction and/or based on an estimated weight of the transportation vehicle and/or a driving profile selection and/or an operating state of the drive train 10 set by the driver and/or based on a state of an electronic stability program set by the driver and/or based on a trailer operation and/or based on the change in position of the gas pedal and/or based on the actual steering behavior of the transportation vehicle. The redistribution occurs, for example, based on driving dynamic parameters, which characterize a driving dynamics of the transportation vehicle.

Finally, a limiting also known as an axle limiting is also illustrated in FIG. 3 by a block 58. The axle limiting occurs, for example, based on available axle torques and/or based on a gradient of a default setting. By the axle limiting is meant that the brake controller, for example, limits at least one of the individual torques during at least a first time period to a maximum first value, which is less than a maximum second value of the at least one individual torque which is allowed by the brake controller during a second time period different from the first time period. However, it is possible, for example, for the first apportionment to shift or distribute a limiting torque, by which the at least one individual torque is limited and thus decreased during the first time period as compared to the second time period, onto the other respective axle, so that on the whole the overall torque desired by the driver can be provided by the drive devices 24 and 26. In this way, an especially dynamic operation can be ensured on the one hand, and on the other hand an especially safe operation of the transportation vehicle.

On the whole, it can be seen that the drive train 10 can be switched between a first operating state, in which the two-wheel drive of the drive train 10 is activated, and a second operating state, in which the four-wheel drive of the drive train 10 is activated. Furthermore, to switch in an especially needs-based and early manner from one of the operating states to the other operating state and, for example, from the two-wheel drive to the four-wheel drive, it is provided in the method for operating the drive train 10 that an electronic computing device 60 of the drive train 10, especially schematically represented in FIG. 1, determines during the driving of the transportation vehicle an aforementioned demand time at which the switching from the one operating state to the other operating state must be completed not later than this. The demand time lies in the future with respect to the determination of the demand time. The computing device 60 can be one of the controllers 32 and 34 or the computing device 60 comprises the controller 32 and/or the controller 34.

Furthermore, based on the demand time so determined, the switching from the one operating state to the other operating state commences at a start time in advance of the demand time, such that the switching is completed by not later than the demand time. This makes it possible, on the one hand, to operate the drive train 10 especially for extensive portions of its overall operating time with the two-wheel drive, so that an especially efficient and hence more effective and less energy consuming operation of the drive train 10 and hence of the transportation vehicle as a whole can be realized. On the other hand, the switching from the two-wheel drive to the four-wheel drive can occur then, and optionally only then, when this is determined, in particular, estimated, to be beneficial, for example, by the electronic computing device 60. The method makes possible an especially early switching on of the four-wheel drive, so that the four-wheel drive is fully switched on when this is required. This is required not later than the demand time, or it is or has been determined by the computing device 60 that the complete switching on of the four-wheel drive not later than the demand time is more beneficial, especially in regard to a safe and/or dynamic driving condition, for example, more beneficial as compared to the two-wheel drive. The method enables an especially high efficiency with no traction drawbacks. In particular, it is possible by the method to maintain the two-wheel drive as long as possible and to use the four-wheel drive only as long as is necessary.

LIST OF REFERENCE NUMBERS

10 Drive train
12 Axle
14 Axle
16 Double arrow
18 Wheel
20 Double arrow
22 Wheel
24 Drive device
26 Drive device
28 Electric machine
30 Electric machine
32 Controller
34 Controller
36 Onboard network
38 Block
40 Block
42 Arrow
44 Block
46 Block
48 Block
50 Arrow
52 Block
54 Block
56 Block
58 Block
60 Electronic computing device

The invention claimed is:

1. A transportation vehicle drive train having an electronic computing device by which the drive train is switched between a plurality of operating states including a first operating state, in which a two-wheel drive of the drive train is activated, and a second operating state, in which a four-wheel drive of the drive train is activated, wherein the electronic computing device is configured to:

determine, during driving of the transportation vehicle, a demand time, not later than which, the switching from one of the plurality of operating states to another operating state must be completed, the demand time lying in the future with respect to the determination of the demand time; and depending on the determined demand time, the switching from the one operating state to the other operating state is commenced at a starting time in advance of the demand time such that the switching is completed by not later than the demand time.

2. The transportation vehicle drive train of claim 1, wherein the switching is commenced based on a switching period required by the drive train for the switching.

3. The transportation vehicle drive train of claim 2, wherein the switching period is calculated by the electronic computing device.

4. The transportation vehicle drive train of claim 2, wherein the switching period is determined based on at least one value stored in a memory and called up from the memory.

5. The transportation vehicle drive train of claim 1, wherein the demand time is determined based on a friction value which characterizes at least a friction between at least one wheel of the drive train and a roadway along which the transportation vehicle is traveling.

6. The transportation vehicle drive train of claim 5, wherein the friction value characterizes a current friction between the at least one wheel and the roadway and/or a friction between the at least one wheel and the roadway lying in the future with respect to the determination of the friction value.

7. The transportation vehicle drive train of claim 5, wherein a measured quantity characterizing a rotary speed of the at least one wheel is detected by at least one sensor, which provides at least one electrical signal characterizing the measured quantity, having a number of signal edges based on which the rotary speed is determined, wherein the number is at least 80.

8. The transportation vehicle drive train of claim 7, wherein the rotary speed is determined based on a subset of the signal edges, wherein a size of the subset is larger than 1 and less than the number, and/or wherein the size of the subset is less than 10.

9. The transportation vehicle drive train of claim 1, wherein the demand time is determined based on a current operating state of the drive train and/or based on a driving profile selected by a driver of the transportation vehicle, and/or based on a state of an electronic stability program of the transportation vehicle, and/or based on a trailer operation of the transportation vehicle, and/or based on a change in a position of an operating element produced by the driver by which at least one drive device of a torque provided to the drive train is adjusted by the driver.

10. A transportation vehicle comprising:
a transportation vehicle drive train having an electronic computing device by which the drive train is switched between a plurality of operating states including a first operating state, in which a two-wheel drive of the drive train is activated, and a second operating state, in which a four-wheel drive of the drive train is activated, wherein the electronic computing device is configured to:
determine, during driving of the transportation vehicle, a demand time, not later than which, the switching from one of the plurality of operating states to another operating state must be completed, the demand time lying in the future with respect to the determination of the demand time; and
depending on the determined demand time, the switching from the one operating state to the other operating state is commenced at a starting time in advance of the demand time such that the switching is completed by not later than the demand time.

11. A method for operating a transportation vehicle drive train, the method comprising:
switching the drive train between a plurality of operating states including a first operating state, in which a two-wheel drive of the drive train is activated, and a second operating state, in which a four-wheel drive of the drive train is activated,
wherein the drive train is switched by an electronic computing device from one of the operating states to the other operating state of the plurality of operating states,
wherein during the driving of the transportation vehicle, a demand time is determined by the electronic computing device not later than which the switching from the one operating state to the other operating state must be completed, wherein the demand time lies in the future with respect to the determination of the demand time; and
depending on the demand time so determined, the switching from the one operating state to the other operating state is commenced at a starting time in advance of the demand time such that the switching is completed by not later than the demand time.

12. The method of claim 11, wherein the switching is commenced based on a switching period required by the drive train for the switching.

13. The method of claim 12, wherein the switching period is calculated by the electronic computing device.

14. The method of claim 12, wherein the switching period is determined based on at least one value stored in a memory and called up from the memory.

15. The method of claim 11, wherein the demand time is determined based on a friction value which characterizes at least a friction between at least one wheel of the drive train and a roadway along which the transportation vehicle is traveling.

16. The method of claim 15, wherein the friction value characterizes a current friction between the at least one wheel and the roadway and/or a friction between the at least one wheel and the roadway lying in the future with respect to the determination of the friction value.

17. The method of claim 15, wherein a measured quantity characterizing a rotary speed of the at least one wheel is detected by at least one sensor, which provides at least one electrical signal characterizing the measured quantity, having a number of signal edges based on which the rotary speed is determined, wherein the number is at least 80.

18. The method of claim 17, wherein the rotary speed is determined based on a subset of the signal edges, wherein a size of the subset is larger than 1 and less than the number, and/or wherein the size of the subset is less than 10.

19. The method of claim 11, wherein the demand time is determined based on a current operating state of the drive train and/or based on a driving profile selected by a driver of the transportation vehicle, and/or based on a state of an electronic stability program of the transportation vehicle, and/or based on a trailer operation of the transportation vehicle, and/or based on a change in a position of an operating element produced by the driver, by which at least one drive device of the torque providing the drive train is adjusted by the driver.

* * * * *